United States Patent Office 3,390,173
Patented June 25, 1968

3,390,173
SOLVENT-BASE SYSTEM AND ITS USE IN ORGANIC REACTIONS
Thomas J. Wallace, Elizabeth, and Alan Schriesheim, Berkeley Heights, N.J., assignors to Esso Research and Engineering Company, a corporation of Delaware
No Drawing. Filed June 10, 1963, Ser. No. 286,501
5 Claims. (Cl. 260—524)

This invention concerns the use of diphenylsulfoxides or derivatives of this compound for use as a novel solvent system in base catalyzed carbanion reactions. The present invention is based on the unique advantages and utility of diphenylsulfoxide type compounds as the solvent for a large variety of base catalyzed organic conversion reactions.

Carbanion reactions are well known in the art and have been employed in a variety of chemical conversions. These reactions proceed via the formation of a carbanion intermediate, i.e., a negatively charged carbon ion. Conventionally, strong basic catalysts are employed, such as the Group I metals, especially the alkali metals, such as sodium and potassium (see U.S. Patent 2,952,719). In order to facilitate these reactions, solvents such as tetrahydrofuran, hexamethylphosphoramide, and dimethylsulfoxide have been used. Processes showing the use of preferred solvents in such reactions are disclosed in copending patent application, U.S. Ser. No. 111,173, filed May 19, 1961, and now Patent No. 3,270,084, for Alan Schriesheim, Charles A. Rowe, Jr., and William Bartok. While the solvents of the type referred to are operable in many types of carbanion reactions, the solvents heretofore known have been of limited utility due to a number of factors. First, the solvents heretofore used have been subject to decomposition at elevated temperatures, necessitating the use of reaction temperatures which do not substantially exceed about 100° C. Secondly, the solvents have been subject to oxidative deterioration resulting in uneconomic loss of solvent during reactions which involve oxidation. Finally, the solvents, due to the limitations referred to, have necessitated use of specific basic materials as catalysts, but have not been practicably operable with certain cheaper and less reactive bases, particularly the alkali metal hydroxides. In accordance with this invention it has been found that diphenylsulfoxide or derivatives of this compound are particularly stable at elevated temperatures, are not subject to oxidative degradation, and enable use of less reactive and less expensive bases for carbanion reactions.

The preferred solvent of this invention is diphenylsulfoxide. This specific compound is characterized by the absence of reactive C—H bonds. Diphenylsulfoxide is characterized by CH-bonds beta to the sulfur atom of the compound, and having SP$^2$ hybridization. Such bonds are uniquely stable in nature, as distinct from alpha-SP$^3$ bonds characteristic of dimethyl sulfoxide for example, and distinct from the beta SP$^3$ bonds characteristic of solvents such as hexamethylphosphoramide. As will be shown hereinafter, it is theorized that the unique properties and advantages of diphenylsulfoxide depend upon this basic feature of chemical bonding.

It is apparent that the advantages of this invention can also be achieved by derivatives of diphenylsulfoxide which may be substituted with $C_1$ to $C_{10}$ alkyl groups in the aromatic ring. Thus, for example, the following derivatives of diphenylsulfoxide can be employed in the practice of this invention: bis-(4-tert-butylphenyl)-sulfoxide, bis-(4-tert-amylphenyl)-sulfoxide, and bis-(3-nonylphenyl)-sulfoxide.

Other solvents adapted for use in the practice of this invention are listed and identified in Table I. These solvents include dibenzothiophene sulfoxide, 4,4'-dipyridine sulfoxide, 3,3'-dipyridine sulfoxide, 1,1'-dipyridine sulfoxide (or combinations of these such as 4,1'-dipyridine sulfoxide, 4,3'-dipyridine sulfoxide), 4,4',4''-tripyridine phosphine oxide, α,α'-bis-thiophene-1-oxide, tris-thienyl phosphine oxide, 9,10-dithio anthracene-9,10-dioxide, benzothiophene-1-oxide, α,α'-dithienyl sulfoxide, β,β'-dithienyl sulfoxide and α,β'-dithienyl sulfoxide. All of the identified compounds are related to the preferred diphenylsulfoxide characterized by the absence of reactive C—H bonds so as to provide uniquely stable solvents for use in the processes of this invention.

TABLE I

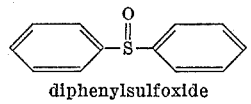

diphenylsulfoxide

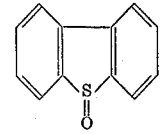

dibenzothiophene sulfoxide

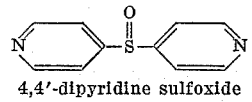

4,4'-dipyridine sulfoxide

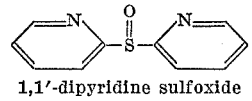

1,1'-dipyridine sulfoxide

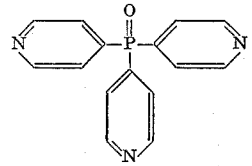

4,4',4''-tripyridine phosphine oxide

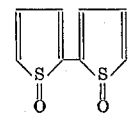

α,α'-bis-thiophene-1-oxide

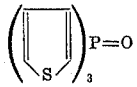

tris-thienyl phosphine oxide

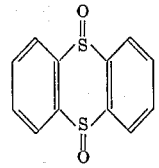

9,10-dithio anthracene-9,10-dioxide

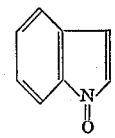

benzothiophene-1-oxide

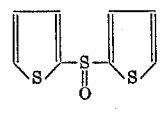

α,α'-dithienyl sulfoxide

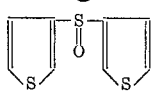

β,β'-dithienyl sufoxide

The solvents of this invention can be advantageously employed for a wide variety of base catalyzed carbanion reactions. In these reactions, the base employed may be any of a wide variety of materials. The only limitation on this material is that it must have sufficient basicity to permit the reactions to proceed. More specifically, a suitable base for use in this invention comprises any basic compound capable of extracting a proton from the reactant compound. Thus, for example, in the oxidation of a ketone any base may be used which will abstract a proton from the alpha carbon hydrogen bond of the ketone so as to form the carbanion intermediate.

Examples of suitable bases include metal hydrides, such as sodium hydrides; metal inorganic amides, such as sodium amide; alkali and alkaline earth organic amides, such as sodium methyl amide; metal alkoxides, such as sodium methoxide and potassium t-butoxide; and alkali and alkaline earth metal hydroxides, such as sodium hydroxide and cesium hydroxide; and metal alkyls, such as sodium ethyl and butyl lithium. Particularly preferred are bases composed of the heavy alkali metals, e.g., potassium, cesium and rubidium. Furthermore, where the base has an alkyl group, effectiveness is increased by increasing the number of carbon atoms; e.g., $KOC_2H_5$ is more effective than $KOCH_3$ and KO-t-butylate is more effective than both. This listing is by way of illustration only. Clearly, other suitable bases are known to those skilled in the art. However, it is a particular feature of this invention that relatively weak bases may be employed due to the feasibility of using higher reaction temperatures in view of the unique stability toward base and oxygen of the diphenylsulfoxide solvents of this invention. In particular, this invention is of application to the use of alkali metal hydroxide for the catalysis of carbanion reactions. Of particular interest is the feasibility of using the relatively cheap sodium hydroxide or potassium hydroxide to catalyze these reactions.

The particular conversion reactions contemplated include a wide variety of known reactions. Broadly, almost any organic compound can be reacted which has an acidic hydrogen attached to a carbon atom which may be removed to form the carbanion intermediate. In addition, since these solvents facilitate ionic reactions, any reaction involving an organometallic compound will be enhanced. The following list will include the major reactions:

(1) the polymerization of olefins, diolefins, and vinyl-type compounds;
(2) Aldol and Cannizzaro condensations and the condensation of malonic esters, including Michael-type additions;
(3) side-chain alkylations of aromatics with olefins, ketones with organic halides, and metal alkyls with olefins;
(4) olefin double-bond and skeletal isomerization;
(5) (a) oxidation of alkyl aromatics, such as toluene, xylene, and mesitylene, etc., to respective mono, and polycarboxylic acids;
   (b) oxidation of various alkyl, nitrogen, and sulfur aromatic ring compounds including alpha, beta, and gamma picolines, and various alkyl thiophenes to the respective mono or diacids;
   (c) oxidation of olefins to acids;
   (d) oxidation of all the materials included in a, b and c, including ammonia as a base so that the ammonia salt is produced directly;
   (e) oxidation of the compounds mentioned in a, b and c to alcohols;
   (f) oxidation of alkyl aromatics to ketones, for example, ethyl benzene to acetophenone;
   (g) oxidation of mercaptans to either disulfides or sulfonic acids;
   (h) oxidation of ketones and particularly cyclic ketones to dicarboxylic acids;
(6) (a) carboxylation of alkyl aromatics, such as toluene, to produce phenylacetic acid;
   (b) carboxylation of olefins, such as propylene, to yield acrylic acid;
(7) carbonylation of alkyl aromatics, olefins, etc. with carbon monoxide to yield aldehydes;
(8) carbene generation from halogen substituted compounds, ethers, sulfides, hexachloroacetone, sodium trichloroacetate, etc. and the addition of the generated carbenes to olefins, diolefins and aromatics;
(9) homogeneous hydrogenation of olefins, diolefins, and aromatics;
(10) formation of vinyl ethers by reaction of alkynes and alcohols;
(11) benzyne formation from any known benzyne precursors;
(12) production and reaction of organo-metallics, such as:
   (a) Grignard reagents from organic halides and magnesium;
   (b) hydroboration of olefins and diolefins;
(13) silene generation and reactions thereof.

The reaction phase may either by homogeneous or heterogeneous, depending upon the particular reaction system and base used. Diphenylsulfoxide itself is water insoluble so that in any reactions involving water as a reactant or by-product, diphenylsulfoxide will not be dissolved in the aqueous phase and a heterogeneous system with water will result. On the other hand, diphenylsulfoxide dissolves all hydrocarbons to the extent of about 1–5 g. hydrocarbon/20 g. diphenylsulfoxide so that homogeneous reaction systems of most hydrocarbons can be based on use of this solvent. Bases such as potassium-tert-butoxide and potassium hydroxide are only partially soluble in diphenylsulfoxide, necessitating use of a heterogeneous reaction system. In those cases involving such a heterogeneous system, fixed beds of the catalyst may be employed with suitable provision for the reactants and diphenylsulfoxide to be brought into contact with the fixed bed of solid basic material. In cases where a gas is present as a reactant, such as oxygen, carbon monoxide, or carbon dioxide, it is apparent that in addition to the heterogeneous liquid-solid phase, the reaction zone will also contain such gases as a gaseous phase.

In heterogeneous base-solvent systems, the base is practically insoluble. However, the amount of solvent present must be sufficient to ensure wetting the surface of the base. More solvent may be used if it is desirable to dissolve the feed. In the case of olefin polymerization, small amounts of base may be employed, the amount of base being determined by the particular molecular weight desired for the product polymer. That lower base concentrations result in higher molecular weight polymers is well known in the art, as is the amount of base that should be employed for a particular molecular weight range.

The ratio of the amount of base to the reactants is also dependent on a variety of factors, such as the particular base, solvent and reaction contemplated. However, this ratio should be adjusted so as to permit the reaction to run at a rate of at least 0.1 w./hr./w. This selection of variables can be readily determined by one skilled in the art.

In carrying out the reactions disclosed herein, temperatures from 15 to 400° C. can be used, and most preferably from 20–150° C. As would be expected, the higher temperatures accelerate the reaction; however, excessively high temperatures may be detrimental to the stability of the solvent-base system and the selectivity of the reaction.

In oxidation reactions it is desirable to more closely regulate the temperature. Preferably temperatures higher than 200° C. should be avoided. Most preferably, oxidation temperatures should be maintained between 20 and 120° C.

EXAMPLE 1

Experiments were studied to determine the oxidative stability of diphenylsulfoxide as compared to the stability of other solvents heretofore known in the art in the presence of bases such as potassium tertiary butoxide and potassium hydroxide. These experiments were conducted at atmospheric oxygen pressure at the temperatures specified in the following data and for the indicated times. Analyses were conducted to determine the oxygen consumed under these conditions. In each case the oxygen consumption was a direct measure of the oxidative reactivity (or conversely, the stability) of the particular base-solvent systems.

TABLE I.—STABILITY STUDIES ON DIPHENYLSULFOXIDE

| Solvent | Type C-H Bond | Base | Temp., °C. | Mmoles $O^2$ Consumed | Time, Hrs. |
|---|---|---|---|---|---|
| Dimethylsulfoxide | $\alpha$-SP$^3$ | KOtBu | 80 | 78.9 | 23 |
| Do | $\alpha$-SP$^3$ | KOH | 80 | 50.4 | 68 |
| Hexamethylphosphoramide | $\beta$-SP$^3$ | KOtBu | 80 | 5.4 | 18 |
| Do | $\beta$-SP$^3$ | KOH | 80 | 1.3 | 54 |
| Diphenylsulfoxide | $\beta$-SP$^2$ | KOtBu | 99 | 0.26 | 20 |
| Do | $\beta$-SP$^2$ | KOH | 99 | 0.002 | 17.5 |
| Do | $\beta$-SP$^2$ | KOH | 120 | 0 | 22 |
| Do | $\beta$-SP$^2$ | KOH | 140 | 1.7 | 22 |

It will be noted that diphenylsulfoxide exhibited remarkable oxidative stability as compared to hexamethylphosphoramide and dimethylsulfoxide. In the presence of potassium hydroxide as a base, for example, the diphenylsulfoxide, even at the elevated temperature of 140° C., reacted with substantially no more oxygen than hexamethylphosphoramide or dimethylsulfoxide at substantially lower temperatures. As indicated in the table, this unique oxidative stability of diphenylsulfoxide correlates with the type of CH-bond characteristic of the solvents referred to and is consistent with the observed stability of the CH-bond systems in these types of compound.

Additional experiments were conducted to demonstrate the remarkable stability of diphenylsulfoxide. In a typical test, diphenylsulfoxide was heated at 100° C. for 24 hours in a glass vessel. G.C. analysis on a 2-foot silicone rubber column at 275° C. established that diphenylsulfoxide was not converted to either diphenylsulfide or diphenylsulfone. Such an oxidation reduction reaction would be expected with dimethylsulfoxide. In other tests, diphenylsulfoxide was exposed to reaction with hydrocarbon hydroperoxides of the type formed during typical hydrocarbon oxidation reactions and it was determined that substantially no diphenylsulfone was formed.

As shown by the data of this example, diphenylsulfoxide is therefore characterized by unique temperature and oxidative stability, particularly adapting it for use in the carbanion reactions of this invention.

EXAMPLE 2

In order to further demonstrate the unique advantages of diphenylsulfoxide in carbanion reactions, representative hydrocarbons were oxidized using potassium tertiary butoxide as the catalytic base and diphenylsulfoxide as the solvent. These experiments are summarized in the following Table II, indicating the reactants and the reaction conditions.

TABLE II.—SUMMARY OF TOLUENE OXIDATION STUDIES IN DIPHENYLSULFOXIDE

[4.73 mmole toluene, diphenylsulfoxide, 100°±2°, 1 atm. $O_2$]

| Base | Base/ Toluene | Time (hrs.) | Benzoic Acid, Mole percent [a] | mmoles $O_2$ Consumed | Theoretical mmoles [b] $O_2$ | Percent Error in $O_2$ |
|---|---|---|---|---|---|---|
| KOtBu | 1 | 13.6 | 25.8 | 1.56 | 1.82 | −13.7 |
| KOtBu | 1 | 17.6 | 28.3 | 1.93 | 2.01 | −3.9 |
| KOtBu | 1 | 20 | 33.5 | 2.20 | 2.38 | −7.9 |
| KOtBu | 2 | 18.5 | 49.4 | 3.52 | 3.48 | +1.2 |
| KOtBu | 3 | 21 | 64.2 | 5.06 | 4.70 | +13 |

[a] Mmoles product/theoretical mmoles×100%.
[b] Based on mmoles acidic product formed.

Material balance was 92 to 110% in these runs. Thus, selectivity is 90–100%.

It may be noted that the products of the indicated oxidation reactions were quantitatively determined by ultraviolet and infrared analyses. In the runs reported, excellent agreement between the theoretical and observed oxygen consumption was found. Acid yields were a function of contact time and base/hydrocarbon ratio. In addition, the amount of carbon dioxide produced in these runs did not exceed that observed in a blank run, indicating that the diphenylsulfoxide solvent is not cooxidized during the oxidation reactions. Further, no other products such as coupling products were formed so the reaction is totally selective to acidic product.

EXAMPLE 3

Similar data were obtained demonstrating the successful oxidation of the ortho-xylene using diphenylsulfoxide as the solvent and potassium tertiary butoxide as the catalytic base. The experiments are summarized in the following Table II showing the reaction conditions.

It may be noted that again the reaction was 100% selective to the acidic products. The yields obtained are seen to be dependent on the contact time and the base to hydrocarbon ratio.

TABLE III.—SUMMARY OF ORTHO-XYLENE OXIDATION STUDIES IN DIPHENYLSULFOXIDE

[4.15 mmole o-xylene, diphenylsulfoxide, 100°±2°, 1 atm. $O_2$]

| Base | Base/ o-Xylene | Time (hrs.) | Mole percent [a] | | Mmoles $O_2$ Consumed | Theoret. mmoles $O_2$ [b] |
|---|---|---|---|---|---|---|
| | | | o-Toluic acid | Phthalic acid | | |
| KOtBu | 1 | 19 | 9.6 | 16.6 | 2.20 | 2.64 |
| KOtBu | 1 | 2.5 | 2.85 | 5.70 | 0.88 | 0.90 |
| KOtBu | 2 | 21 | 35.6 | 17.3 | 4.20 | 4.38 |
| KOtBu | 3 | 21 | 54.1 | 37.5 | 4.50 | 5.60 |

[a] Mmoles product/theoretic mmoles×100.
[b] Based on the mmoles of acidic product formed.

EXAMPLE 4

Using a molten mixture consisting of 12 g. of sodium hydroxide in 16 g. of diphenylsulfoxide, 1.23 g. of cyclohexanone were oxidized at 100° C. under one atmosphere pressure of oxygen for 22 hours. The yield of adipic acid under these conditions was 70%.

What is claimed is:

1. An improved solvent-base system for the conversion of organic compounds containing a weakly ionizable carbon to hydrogen bond which consists of a base catalyst capable of extracting a proton from the organic reactant compound and diphenylsulfoxide as the solvent.

2. A process for the oxidation of an organic compound containing a weakly ionization carbon to hydrogen bond which comprises reacting the same with oxygen in contact with a base-solvent system as defined in claim 1 at temperatures of about 20–150° C.

3. A process as defined in claim 2 wherein the organic compound containing a weakly ionizable carbon to hydrogen bond is an alkylbenzene.

4. The base-solvent system as defined in claim 1 wherein said base catalyst is an alkali metal hydroxide.

5. The base-solvent system as defined in claim 1 wherein said base catalyst is an alkali metal alkoxide.

References Cited

UNITED STATES PATENTS 3,023,183  2/1962  Nelson _____ 260—407 X

OTHER REFERENCES

Cram et al.: J.A.C.S., vol. 81 (Nov. 5, 1959), pp. 5774–5784.

Shriner et al., "The Preparation and Properties of Certain Sulfoxides and Sulfones," J.A.C.S., vol. 52 (1930), pp. 2060–2069.

HENRY R. JILES, *Primary Examiner.*

R. K. JACKSON, LORRAINE A. WEINBERGER, *Examiners.*

S. B. WILLIAMS, *Assistant Examiner.*